(12) United States Patent
Maeda

(10) Patent No.: US 10,409,746 B2
(45) Date of Patent: Sep. 10, 2019

(54) MEMORY ACCESS CONTROL DEVICE AND CONTROL METHOD OF MEMORY ACCESS

(71) Applicant: FUJITSU LIMITED, Kawasaki-shi, Kanagawa (JP)

(72) Inventor: Koichi Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/964,250

(22) Filed: Apr. 27, 2018

(65) Prior Publication Data

US 2018/0329841 A1   Nov. 15, 2018

(30) Foreign Application Priority Data

May 10, 2017   (JP) ................................ 2017-093914

(51) Int. Cl.
| *G06F 13/28* | (2006.01) |
| *G06F 12/02* | (2006.01) |
| *G06F 13/16* | (2006.01) |
| *G06F 12/0855* | (2016.01) |
| *G06F 12/06* | (2006.01) |

(52) U.S. Cl.
CPC .......... *G06F 13/28* (2013.01); *G06F 12/0284* (2013.01); *G06F 12/0292* (2013.01); *G06F 12/0857* (2013.01); *G06F 13/1631* (2013.01); *G06F 13/1642* (2013.01); *G06F 12/06* (2013.01); *G06F 2212/1024* (2013.01); *G06F 2212/1041* (2013.01)

(58) Field of Classification Search
None
See application file for complete search history.

(56) References Cited

U.S. PATENT DOCUMENTS

| 6,067,595 A * | 5/2000 | Lindenstruth ....... G06F 12/0292 710/307 |
| 6,115,803 A * | 9/2000 | Hayashi .................... G06F 9/54 709/206 |
| 6,772,315 B1 * | 8/2004 | Perego ................ G06F 12/1027 711/117 |
| 7,899,784 B2 * | 3/2011 | Gu ........................ G06F 16/284 707/616 |
| 2005/0097244 A1 | 5/2005 | Hayasaka |

(Continued)

FOREIGN PATENT DOCUMENTS

| JP | 11-134287 | 5/1999 |
| JP | 2005-141299 | 6/2005 |
| JP | 2010-152837 | 7/2010 |

*Primary Examiner* — Michael Sun
(74) *Attorney, Agent, or Firm* — Fujitsu Patent Center

(57) ABSTRACT

A memory access control device includes: a memory configured to hold data from a host device; and a processor coupled to the memory, the processor: detects an overlapping portion of addresses of data transfer sources of a plurality of memory access requests; merges, in a case where the overlapping portion is detected, read accesses to the data transfer sources for the overlapping portion of the plurality of memory access requests collectively to generate a merged memory access request; executes a data transfer in accordance with the merged memory access request; and instructs writing of data transferred in the data transfer to a plurality of addresses of data transfer destinations of the plurality of memory access requests.

12 Claims, 10 Drawing Sheets

(56) References Cited

U.S. PATENT DOCUMENTS

| | | | | |
|---|---|---|---|---|
| 2005/0226235 A1* | 10/2005 | Kumar | .................... | H04L 29/06 370/386 |
| 2009/0241010 A1* | 9/2009 | Yano | ................... | G06F 11/1072 714/764 |
| 2010/0180105 A1* | 7/2010 | Asnaashari | ......... | G06F 13/1631 712/226 |
| 2011/0264859 A1* | 10/2011 | Yano | ................... | G06F 12/0246 711/118 |
| 2014/0006685 A1* | 1/2014 | Peterson | ............ | G06F 12/0238 711/102 |

\* cited by examiner

FIG. 3

| REQUEST | ADDRESS | SIZE |
|---|---|---|
| A SINGLE PORTION | START ADDRESS_A | START ADDRESS_B − START ADDRESS_A |
| OVERLAPPING PORTION (C) OF A AND B | START ADDRESS_B | (START ADDRESS_A + Size_A) − START ADDRESS_B |
| B SINGLE PORTION | START ADDRESS_A+Size_A | (START ADDRESS_B + Size_B) − (START ADDRESS_A + Size_A) |

FIG. 4A

| ENTRY | SOURCE ADDRESS | MC | DESTINATION ADDRESS#0 | DESTINATION ADDRESS#1 | ... | DESTINATION ADDRESS#N |
|---|---|---|---|---|---|---|
| 0 | A | NO | X0 | – | | – |
| 1 | B | YES | X1 | Y0 | | – |
| 2 | C | NO | – | Y1 | | – |
| 3 | | | | | | |
| ... | | | | | | |
| N | | | | | | |

FIG. 4B

|   | SOURCE ADDRESS (HOST SIDE) | DESTINATION ADDRESS (DEVICE SIDE) | |
|---|---|---|---|
|   |   | MAC #0 | MAC #1 |
| A |   | X0 |   |
| B |   | X1 | Y0 |
| C |   |   | Y1 |

FIG. 7A

| ENTRY | SOURCE ADDRESS | MC | DESTINATION ADDRESS#0 | DESTINATION ADDRESS#1 | DESTINATION ADDRESS#2 |
|---|---|---|---|---|---|
| 0 | A | NO | X0 | – | – |
| 1 | B | YES | X1 | Y0 | – |
| 2 | C | YES | X2 | Y1 | Z0 |
| 3 | D | YES | – | Y2 | Z1 |
| 4 | E | NO | – | – | Z2 |
| 5 | | | | | |
| ... | | | | | |
| N | | | | | |

FIG. 7B

SOURCE ADDRESS (HOST SIDE)   DESTINATION ADDRESS (DEVICE SIDE)

MAC #0   MAC #1   MAC #2

A — X0

B — X1   Y0

C — X2   Y1   Z0

D —       Y2   Z1

E —             Z2

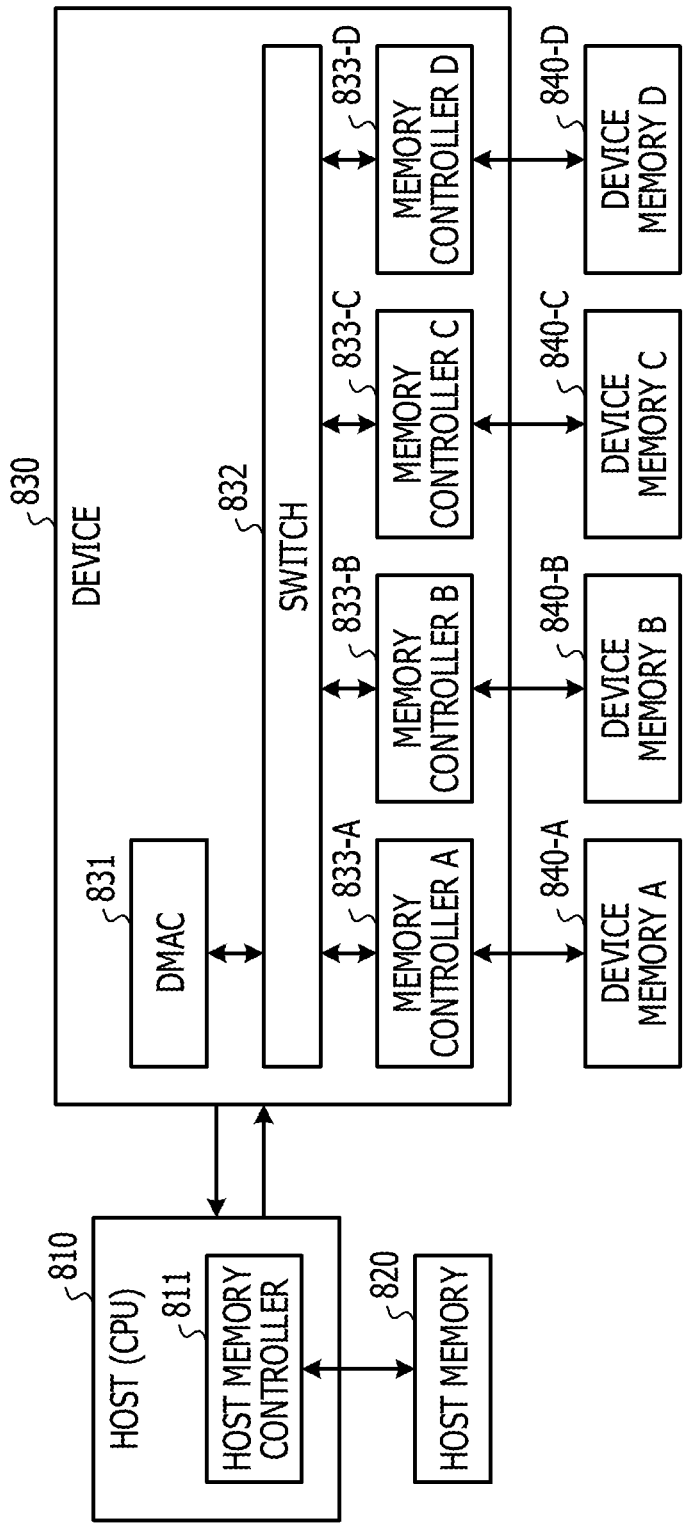

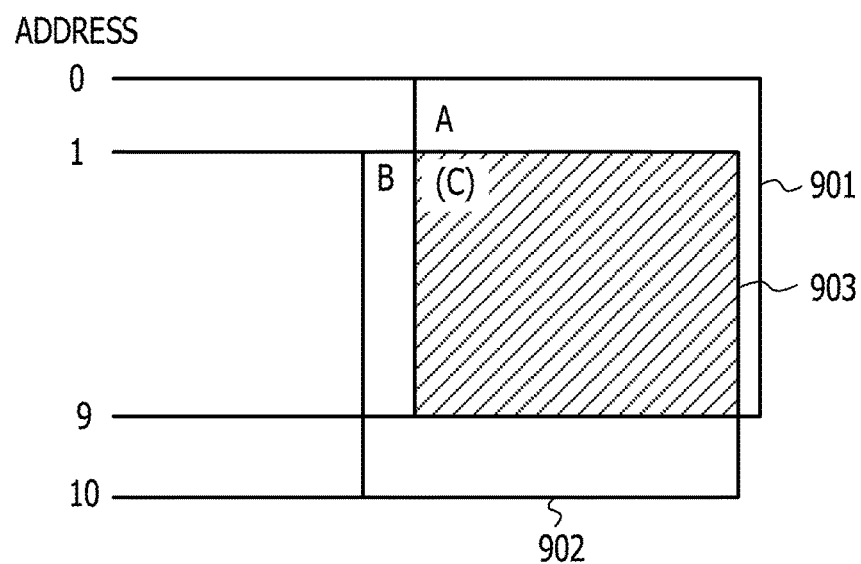

MEMORY ACCESS CONTROL DEVICE AND CONTROL METHOD OF MEMORY ACCESS

CROSS-REFERENCE TO RELATED APPLICATION

This application is based upon and claims the benefit of priority of the prior Japanese Patent Application No. 2017-093914, filed on May 10, 2017, the entire contents of which are incorporated herein by reference.

FIELD

The embodiment discussed herein is related to a memory access control device and a control method of a memory access.

BACKGROUND

In a direct memory access (DMA) transfer method, a peripheral device directly transfers data to and receives data from a memory (host memory) coupled to a host device without the central processing unit (CPU) of the host device being interposed. In the DMA transfer method, the CPU notifies, a DMA control device (DMA controller) present inside the peripheral device or on a bus, of a data transfer request (DMA request), and the DMA control device performs data transfer in accordance with the DMA request.

Related technologies are disclosed in Japanese Laid-open Patent Publication No. 11-134287, Japanese Laid-open Patent Publication No. 2005-141299, and Japanese Laid-open Patent Publication No. 2010-152837.

SUMMARY

According to an aspect of the embodiments, a memory access control device includes: a memory configured to hold data from a host device; and a processor coupled to the memory, the processor: detects an overlapping portion of addresses of data transfer sources of a plurality of memory access requests; merges, in a case where the overlapping portion is detected, read accesses to the data transfer sources for the overlapping portion of the plurality of memory access requests collectively to generate a merged memory access request; executes a data transfer in accordance with the merged memory access request; and instructs writing of data transferred in the data transfer to a plurality of addresses of data transfer destinations of the plurality of memory access requests.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an exemplary DMA descriptor merged;

FIGS. 4A and 4B illustrate an exemplary merge address table;

FIGS. 7A and 7B illustrate an exemplary merge address table;

FIG. 8 illustrates an exemplary computer system including a DMA control device;

FIGS. 9A and 9B illustrate an exemplary DMA request including an overlapping portion.

DESCRIPTION OF EMBODIMENT

A CPU of a host device transmits a DMA request including information such as a source address to be a transfer source, a destination address to be a transfer destination, a transfer size, and the like to a DMA control device. Such information used for the DMA transfer may be collectively referred to as a DMA descriptor (transfer descriptor). When the DMA control device which has received the DMA request starts DMA transfer processing, the DMA control device transmits a memory read request for a source address indicated in the DMA descriptor to a memory controller on the host device side which performs a memory access to the host memory.

When the memory controller on the host device side receives the memory read request, the memory controller performs a read access to the host memory and transmits the read data as response data to the DMA control device. When the DMA control device receives the response data, the DMA control device writes the response data to the destination address indicated in the DMA descriptor. These operations are repeatedly performed for the transfer size indicated in the DMA descriptor by sequentially changing the address, whereby data transfer by DMA transfer is completed. For example, when a DMA control device is present in a peripheral device, data movement from the peripheral device to the host memory is called DMA write, and data movement from the host memory to the peripheral device is called DMA read.

For example, DMA read illustrated in FIG. 9A is performed from the peripheral device to the host memory. In DMA request A, a read access is performed on addresses 0 to 9 of the host memory, and in DMA request B, a read access is performed on addresses 1 to 10 of the host memory. As illustrated in FIG. 9B, an area (A) 901 read-accessed by the DMA request A and an area (B) 902 read-accessed by the DMA request B overlap at an area (C) 903 of the addresses 1 to 9.

Figure 10:
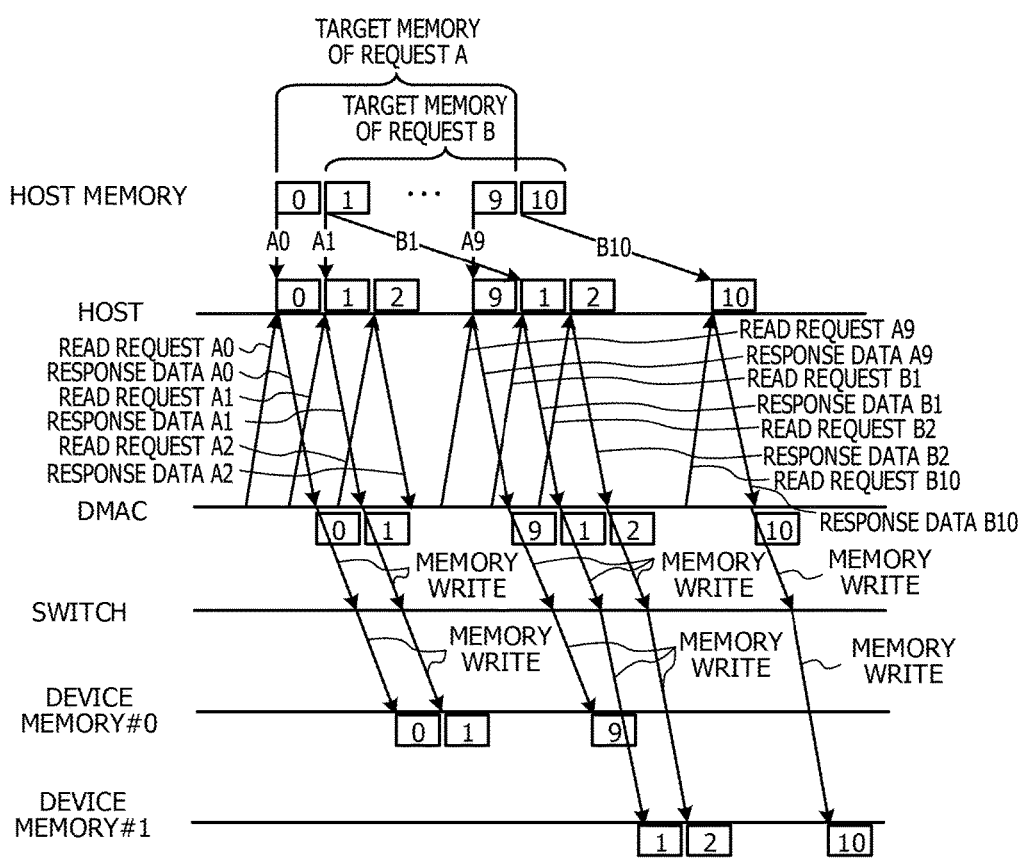
FIG. 10 illustrates exemplary data transfer by the DMA control device.

For example, in a certain DMA control device, as illustrated in FIG. 10, for each of the DMA request A and the DMA request B, memory read requests are transmitted to the memory controller on the host device side one by one, and response data is written to a corresponding area in a device memory. Therefore, as illustrated in FIG. 10, read accesses to the addresses 1 to 9 of the host memory occurs twice.

For example, in memory accesses when filtering is performed on an image, an access to an overlapping area may occur frequently. In a case where the filtering processing is performed on the image by a device different from the host device, data to be processed is transferred from the host memory to the device by a DMA read request. However, an access to overlapping addresses occurs one by one, which takes time, and data transfer processing may become a bottleneck.

For example, a memory access control device that improves data transfer performance may be provided.

Figure 1:
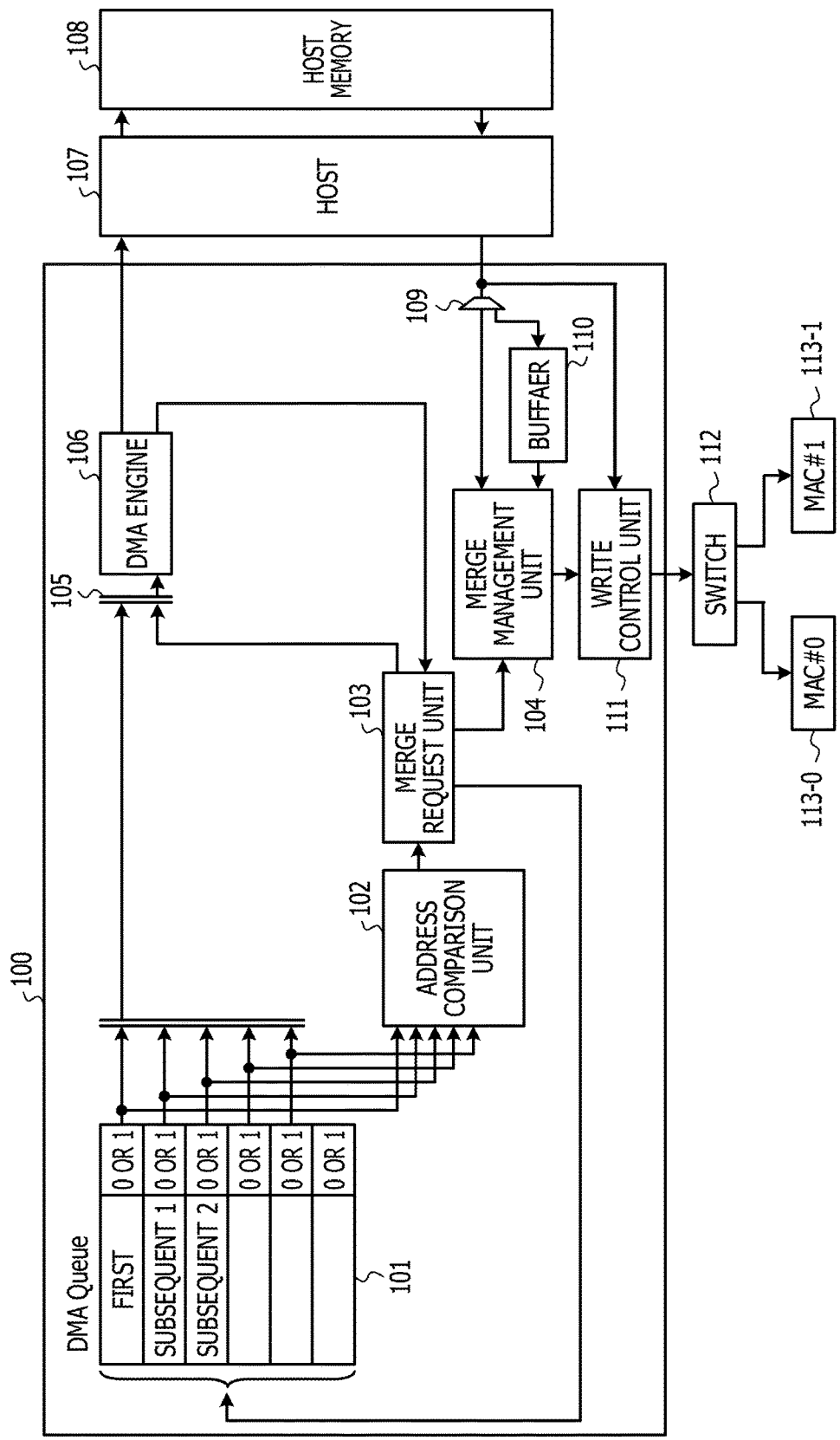
FIG. 1 illustrates an exemplary configuration of a DMA control device.

FIG. 1 illustrates an exemplary direct memory access (DMA) control device. A DMA control device 100 is coupled to a memory controller of a host device 107 that performs a memory access to a host memory 108. The DMA control device 100 is coupled via a switch 112 to a memory controller (MAC) 113 that performs a memory access to the device memory (not illustrated).

The switch 112 as a transmission unit issues, to the memory controller 113 corresponding to the destination address, a memory write request for requesting writing, to the device memory, of response data to the DMA request. The switch 112 has a multicast function of simultaneously issuing memory write requests to two or more memory controllers 113. FIG. 1 illustrates an example in which two memory controllers 113-0 and 113-1 are present, but a desired number of memory controllers 113 are coupled to the DMA control device 100 via the switch 112. The switch 112 may be provided inside the DMA control device 100.

The DMA control device 100 includes a DMA queue 101, an address comparison unit 102, a merge request unit 103, a merge management unit 104, a selector 105, a DMA engine 106, a demultiplexer 109, a buffer 110, and a write control unit 111. The DMA queue 101 stores data transfer requests (DMA requests) in the DMA transfer method notified from a CPU of the host device 107. For example, the DMA queue 101 stores DMA descriptors (transfer descriptors) related to the DMA requests notified from the CPU, and sequentially outputs the DMA descriptors.

The DMA descriptor includes information such as a source address serving as a data transfer source in a DMA transfer, a destination address serving as a data transfer destination, and a transfer size. The DMA descriptor may include an overtaking flag that indicates whether a subsequent DMA request is allowed to overtake. For example, when a value of the flag is "1", the subsequent DMA request may be prohibited from overtaking. The overtaking flag may be added to the DMA descriptor, for example, on the side of the host device, by determining whether it is possible to overtake by the subsequent DMA request.

The address comparison unit 102 as a detection unit compares address information and the like of the DMA descriptors stored in the DMA queue 101 and detects an overlapping portion between the addresses of the data transfer sources in the stored DMA descriptors. The address comparison unit 102 detects an overlapping portion of the addresses of the data transfer sources in a first DMA request in the DMA queue 101 and subsequent DMA requests.

Figure 2:
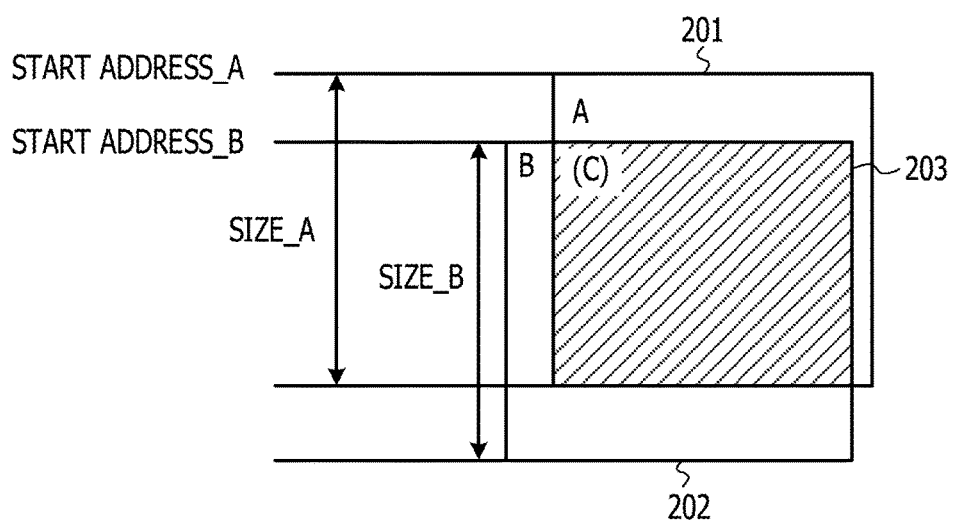
FIG. 2 illustrates an exemplary detection of an overlap portion of DMA requests.

When a DMA request with a start address_A and a transfer size Size_A, and a DMA request with a start address_B and a transfer size Size_B satisfy a relationship of (start address_A+Size_A)−(start address_B)>0, the address comparison unit 102 determines that there is an overlapping portion in the addresses of the data transfer sources. At this time, as illustrated in FIG. 2, the address comparison unit 102 detects an area (C) 203 from the start address_B to (start address_A+Size_A) as an overlapping portion of the addresses of the data transfer sources. In FIG. 2, an area (A) 201 is an area to be read-accessed by the DMA request with the start address_A and the transfer size Size_A, and an area (B) 202 is an area to be read-accessed by the DMA request with the start address_B and the transfer size Size_B.

In a case where a plurality of DMA requests having an overlapping portion are detected at the addresses of the data transfer sources by the address comparison unit 102, the merge request unit 103 as a merge unit merges these DMA requests, generates a DMA descriptor according to the merged DMA request, and stores the DMA descriptor in an internal queue buffer. The merge request unit 103 releases the DMA requests before merge from the DMA queue 101 and outputs information of the DMA descriptor according to the merged DMA requests to the merge management unit 104.

For example, as illustrated in FIG. 2, when two DMA requests have an overlapping portion of addresses, the merge request unit 103 merges the read accesses to the overlapping portion of the two DMA requests collectively to generate a DMA descriptor as illustrated in FIG. 3. For example, a DMA request with the start address_A and a transfer size (start address_B−start address_A) for a single portion of an area A, a DMA request with the start address_B and a transfer size ((start address_A+Size_A)−start address_B) for an overlapping portion (C) of areas A and B, and a DMA request with (start address_A+Size_A) and a transfer size ((start address_B+Size_B)−(start address_A+Size_A)) for a single portion of the area B are generated.

If a DMA descriptor has an overtaking flag, the merge request unit 103 examines whether or not two DMA requests having an overlapping portion at the addresses of the data transfer sources are able to be overtaken and merges the DMA requests. If DMA requests up to the (N−1)th DMA request of the DMA queue 101 are able to be overtaken and a N-th DMA request is prohibited to be overtaken, it is possible to merge the DMA requests up to the (N−1)th DMA request.

For example, a DMA request whose value of the overtaking flag of the DMA descriptor is "1" and DMA requests after the DMA request may not be merged with a DMA request before the DMA request having the value of "1". For example, even if there is an overlapping portion in a start (first) DMA request and a subsequent third DMA request, in a case where a subsequent second DMA request is prohibited to be overtaken, the third DMA request may not overtake the second DMA request, and thus it is not possible to merge the first DMA request with the third DMA request.

The merge management unit 104 as a management unit receives the information of the DMA descriptor according to the DMA request after merge from the merge request unit 103 and stores the information in a merge address table. FIG. 4A illustrates an exemplary merge address table. The merge address table is a table illustrating the correspondence between the source address and the destination address in the merged DMA request. In the merge address table, it is possible to describe a plurality of destination addresses for a source address, and it is possible to describe destination addresses by the number of merged DMA requests.

In FIG. 4A, a source address A of a DMA request whose DMA descriptor is stored in an entry 0 is associated with a destination address X0. A source address B of a DMA request whose DMA descriptor is stored in an entry 1 is associated with destination addresses X1 and Y0, and a source address C of a DMA request whose DMA descriptor is stored in an entry 2 is associated with a destination address Y1. Further, with respect to the overlapping portion (DMA request in the entry 1), a multicast flag MC is "Yes", and the response data to this portion may be written into a device memory by multicasting.

When response data to the merged DMA request is received, the merge management unit 104 refers to the merge address table, acquires the corresponding destination addresses, issues a memory write request to the addresses, and instructs writing of the response data. For example, the response data is written to the device memory as illustrated in FIG. 4B by referring to the merge address table illustrated in FIG. 4A.

The selector 105 selects and outputs the DMA descriptor output from the DMA queue 101 or the DMA descriptor of the merged DMA request output from the merge request unit 103. For example, the selector 105 normally selects and outputs the DMA descriptor output from the DMA queue 101, and selects and outputs the DMA descriptor output from the merge request unit 103 when there is a merged DMA request.

The DMA engine 106 issues a memory read request to the memory controller of the host device 107 in accordance with the DMA descriptor output from the selector 105. When the memory controller of the host device 107 receives the memory read request from the DMA engine 106, the memory controller of the host device 107 performs a read access to the host memory 108 and returns the read data as response data to the DMA control device 100. In a case where the DMA processing based on the DMA descriptor of the merged DMA request is complete, the DMA engine 106 notifies the merge request unit 103 of the completion.

If the DMA request is not a merged DMA request, the response data from the host device 107 is output to the write control unit 111, and if the DMA request is a merged DMA request, the response data from the host device 107 is output to the merge management unit 104 and the buffer 110 via the demultiplexer 109. The buffer 110 is a buffer for holding response data from the host device 107. When response data is returned from the host device 107, the write control unit 111 controls processing of writing the response data to the device memory.

For example, when response data to a merged DMA request is returned, writing of the same data to a plurality of destination addresses occurs. In a case of writing to a device memory coupled to a different memory controller, performing write processing collectively by multicasting, and writing to the device memory coupled to the same memory controller, write processing is performed serially by using the buffer 110.

For example, in a case of writing to a device memory coupled to a different memory controller, response data after merge is transmitted to the switch 112 by "multicast-writing" and thereby the switch 113 multicasts the response data to each memory controller 113. When each memory controller 113 receives data by multicast-writing, each memory controller 113 writes the data to the device memory. In a case where multicast-writing is instructed, but writing may not be done in a busy state or the like, response data held in the buffer 110 is written after writing becomes possible. In a case of writing to a device memory coupled to the same memory controller, response data of the overlapping portion is divided into certain units, and the divided data are written into the device memory respectively. In this case, subsequent response data is controlled by using the buffer 110 so as not to overflow.

The DMA control device 100 has a function of detecting the overlapping portion of the addresses of the data transfer sources in the plurality of DMA descriptors stored in the DMA queue 101. When an overlapping portion of the addresses of the data transfer sources is detected, DMA requests having the overlapping portion are merged, and thus accesses to the overlapping address portion are realized by one read access. The response data to the overlapping portion is managed by the DMA control device 100 and written to each device memory corresponding to the destination address by the multicasting or the like. Since DMA read to the overlapping portion is performed by one read access in this manner, the transfer time may be shortened, the bottleneck of the transfer processing may be improved, and the data transfer performance may be improved as compared with the case where an access is performed on the overlapping portion one by one for each DMA request.

Figure 5:
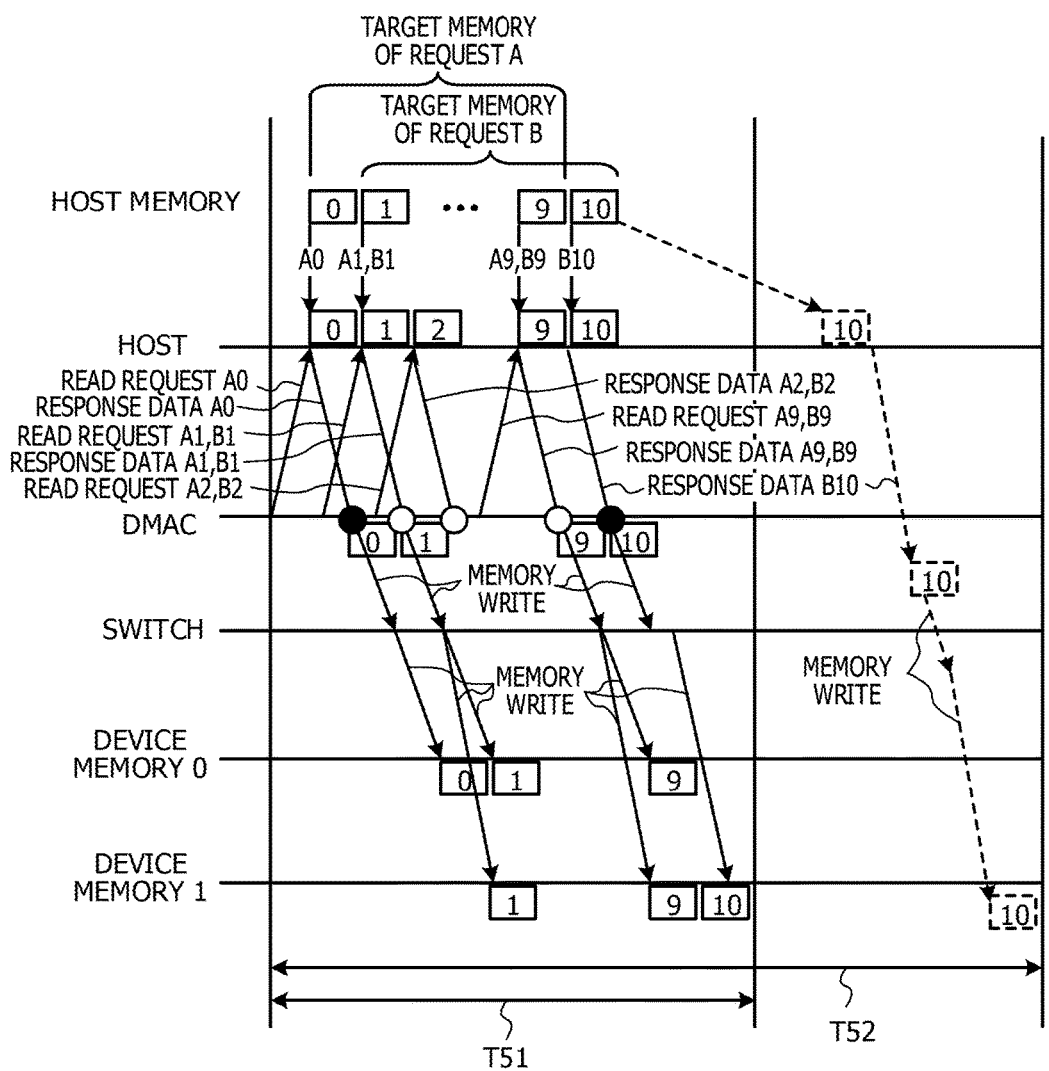
FIG. 5 illustrates exemplary data transfer by the DMA control device.

For example, in the case of performing the DMA read illustrated in FIG. 9A, since the read accesses to the addresses 1 to 9 of the host memory overlap, as illustrated in FIG. 5, the DMA control device 100 collectively transmits the memory read request for the DMA request A and the DMA request B. For example, since the multicast flag (indicated by a white circle in FIG. 5) is set in the overlapping portion, response data is written by multicast-writing to a device memory 0 and a device memory 1. Therefore, the DMA control device 100 completes the processing for the DMA request A and the DMA request B in a period T51. Therefore, compared to a processing time T52 by the DMA control device illustrated in FIG. 10, the data transfer efficiency is improved and the transfer time is shortened.

Figure 6:
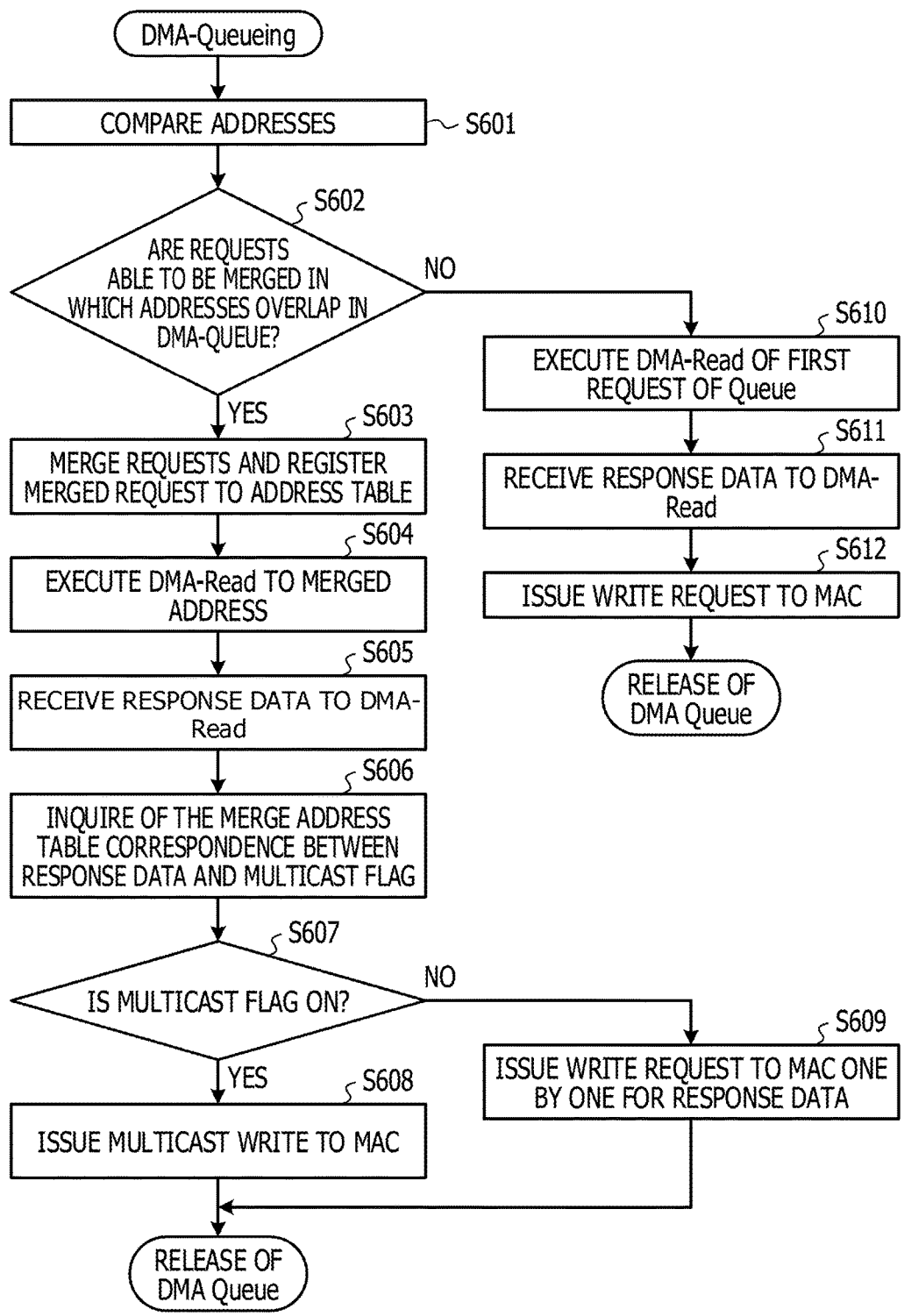
FIG. 6 illustrates an exemplary operation of the DMA control device.

FIG. 6 illustrates an exemplary DMA read operation in a DMA control device. When a DMA descriptor is written in the DMA queue 101 in response to a command from the host device 107, in step S601, the address comparison unit 102 as a detection unit compares address information and the like of the DMA descriptor stored in the DMA queue 101 and detects an overlapping portion of the address of the data transfer source in the stored DMA descriptor. In step S602, the merge request unit 103 determines whether or not there are DMA requests to be merged in which the addresses of the data transfer sources overlap in the DMA queue 101, based on the detection result and the like in the address comparison unit 102.

When it is determined that there are DMA requests able to be merged in which the addresses of the data transfer sources overlap, the merge request unit 103 merges the DMA requests with overlapping addresses of the data transfer sources and registers the merged DMA request in the merge address table of the merge management unit 104 in step S603. The multicast flag is set for the merged DMA request. In step S604, the DMA engine 106 executes a DMA read to the merged address in accordance with the DMA descriptor from the merge request unit 103. In step S605, the response data to the DMA read is returned from the host device 107.

In step S606, an inquiry on correspondence between response data and the multicast flag is made to the merge address table of the merge management unit 104. In step S607, the merge management unit 104 determines whether or not the multicast flag is on (Yes). In a case where it is determined that the multicast flag is on as a result of the determination, the DMA control device issues a multicast write of response data to the memory controller 113 in step S608. For example, the DMA control device sends a packet with the multicast flag to the switch 112 so that the switch 112 simultaneously executes a memory write request to each target memory controller. In a case where it is determined that the multicast flag is not on, the DMA control device issues a memory write request to the memory controller 113 one by one for response data in step S609. Thereafter, the DMA descriptor stored in the merge request unit 103 is released.

In step S602, in a case where it is determined that there is no DMA requests to be merged, the DMA engine 106 executes a DMA read in step S610 according to the first DMA request (the first DMA descriptor) in the DMA queue 101, and response data to the DMA read is returned from the host device 107 in step S611. In step S612, the DMA control device issues a memory write request of the response data to the memory controller 113. Thereafter, the DMA descriptor stored in the DMA queue 101 is released.

The addresses of the data transfer sources may overlap in the two DMA requests, and the addresses of the data transfer sources may overlap in three or more DMA requests. For example, simultaneous DMA reads may be performed on the overlapping portion by extending the merge address table and registering the addresses of the overlapping portions in three or more DMA requests.

For example, in FIG. 7A, the source address A of the DMA request whose DMA descriptor is stored in an entry 0 is associated with the destination address X0, and the source address B of the DMA request whose DMA descriptor is stored in the entry 1 is associated with the destination addresses X1 and Y0. A source address C of the DMA request whose DMA descriptor is stored in the entry 2 is associated with destination addresses X2, Y1, and Z0, and a source address D of the DMA request whose DMA descriptor is stored in an entry 3 is associated with destination addresses Y2 and Z1. A source address E of the DMA request whose DMA descriptor is stored in an entry 4 is associated with a destination address Z2. With respect to the overlapping portion (DMA requests of the entries 1, 2, and 3), the multicast flag MC is "Yes", and the response data to this portion may be written by multicasting to the device memory. The response data is written to the device memory as illustrated in FIG. 7B by referring to the merge address table illustrated in FIG. 7A.

The buffer 110 holds response data to the merged DMA request, but the response data may also be used for data sharing at the overlapping portion between DMA descriptors not to be overtaken as below. For example, it is assumed that the first DMA request and the third DMA request have an overlapping portion at the addresses of the data transfer sources and the second DMA request is prohibited to be overtaken. In this case, when the response data to the first DMA request is saved in the buffer 110, the second DMA request is complete, and the third DMA request is executed, extra access to a host memory is reduced by issuing a DMA request by excluding data of a portion overlapping with the first DMA request.

It is possible to simultaneously broadcast the same response data to a plurality of memory controllers 113 by describing in advance an instruction of multicasting response data in the DMA descriptor on the host device side and by using the buffer 110. Write processing by multicasting may be realized by holding information indicating "response data is multicast-instructed data by the host device" in the write control unit 111 and issuing a memory write request to all corresponding memory controllers corresponding to the switch 112.

FIG. 8 illustrates an exemplary computer system having a DMA control device. A DMA control device 831 issues to a host memory controller 811 a memory read request to a host memory 820 by notifying, of the DMA request, the DMA control device 831 included in the device 830 from the host device 810. In response, the host memory controller 811 performs a read access to the host memory 820 and writes response data to the device memory 840.

In FIG. 8, there are four memory controllers 833 in the device 830, and there are four device memories attached respectively. In a case where the host device 810 notifies, of a plurality of DMA requests, the DMA control device 831 of the device 830 and each DMA request transfers data of the same address in the host memory 820 to device memories 840-A to 840-D, four DMA requests are merged by merging the above DMA requests, and data may be written to all the device memories 840 by one data transfer.

The number of DMA queues 101 may be six, and the number of DMA queues 101 is not limited thereto, and the number of DMA queues 101 may be increased according to specifications or the like. DMA transfer may be performed between the host device and the device, or may be performed between devices or DMA transfer between host devices. Similarly, the transfer efficiency improves and the data transfer performance improves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A memory access control device comprising:
   a memory configured to hold data from a host device; and
   a processor coupled to the memory, the processor:
   detects, from among a plurality of data transfer requests from respective data transfer source addresses to respective data transfer destination address, an overlapping portion of addresses of at least two data transfer source addresses of the data transfer source addresses;
   generates, in a case where the overlapping portion is detected, a merged data transfer request by merging read accesses to the overlapping portion of the at least two data transfer source addresses collectively;
   executes a data transfer in accordance with the merged data transfer request; and
   instructs writing of the data transferred in the data transfer to at least two data transfer destination address corresponding to the at least two data transfer source addresses by referring to table information in which the data transfer destination address and information indicating a multicast write are associated with the respective data transfer source addresses.

2. The memory access control device according to claim 1, wherein the processor performs a multicast writing to the data transfer destination address having the information indicating that the multicast write is set as the at least two data transfer destination addresses.

3. The memory access control device according to claim 1, wherein the processor instructs simultaneous writing of data of the overlapping portion transferred in the data transfer to the at least two data transfer destination addresses.

4. The memory access control device according to claim 3, wherein a write instruction of the data of the overlapping portion transferred in the data transfer is transmitted in multicast to the at least two data transfer destination addresses, based on the instruction.

5. The memory access control device according to claim 1, wherein the processor merges the read accesses to the data transfer sources for the overlapping portion of the at least two data transfer source addresses to execute the read accesses to the overlapping portion at one time.

6. The memory access control device according to claim 1, wherein the processor merges the read accesses to the data transfer sources for the overlapping portion of the at least two data transfer source addresses, for each of one or more data transfer requests capable of being overtaken prior to a data transfer request prohibited to be overtaken.

7. A control method of a memory access comprising:
   detecting, by a processor, from among a plurality of data transfer requests from respective data transfer source addresses to respective data transfer destination address, an overlapping portion of addresses of at least two data transfer source addresses of the data transfer source addresses;
   generating, in a case where the overlapping portion is detected, a merged data transfer request by merging read accesses to the overlapping portion of the at least two data transfer source addresses collectively;
   executing a data transfer in accordance with the merged data transfer request; and
   instructing writing of the data transferred in the data transfer to at least two data transfer destination addresses corresponding to the at least two data transfer source addresses by referring to table information in which the data transfer destination address and information indicating a multicast write are associated with the respective data transfer source addresses.

8. The control method according to claim 7, further comprising performing a multicast writing to the data transfer destination address having the information indicating that the multicast write is set as the at least two data transfer destination addresses.

9. The control method according to claim 7, further comprising instructing simultaneous writing of data of the overlapping portion transferred in the data transfer to the at least two data transfer destination addresses.

10. The control method according to claim 9, further comprising transmitting a write instruction of the data of the overlapping portion transferred in the data transfer in multicast to the at least two data transfer destination addresses, based on the instruction.

11. The control method according to claim 7, wherein the read accesses to the data transfer sources for the overlapping portion of the at least two data transfer source addresses are merged to execute the read accesses to the overlapping portion at one time.

12. The control method according to claim 7, wherein the read accesses to the data transfer sources for the overlapping portion of the at least two data transfer source addresses are merged, for each of one or more data transfer requests capable of being overtaken prior to a data transfer request prohibited to be overtaken.

* * * * *